(12) United States Patent
Tredeau et al.

(10) Patent No.: US 7,909,237 B2
(45) Date of Patent: Mar. 22, 2011

(54) MONETARY TRANSACTION SYSTEM AND METHOD

(76) Inventors: Todd Tredeau, Spencer, NV (US); Vasil Kostov, Austin, TX (US)

( * ) Notice: Subject to any disclaimer, the term of this patent is extended or adjusted under 35 U.S.C. 154(b) by 559 days.

(21) Appl. No.: 10/972,496

(22) Filed: Oct. 25, 2004

(65) Prior Publication Data

US 2006/0086783 A1    Apr. 27, 2006

(51) Int. Cl.
  *G06F 17/00*      (2006.01)
(52) U.S. Cl. .................................. 235/375; 235/379
(58) Field of Classification Search ................ 235/379, 235/380, 375, 382; 705/42–45
  See application file for complete search history.

(56) References Cited

U.S. PATENT DOCUMENTS

| | | | | |
|---|---|---|---|---|
| 5,504,677 A * | 4/1996 | Pollin | ............................ | 705/45 |
| 5,570,465 A | 10/1996 | Tsakanikas | .................. | 358/1.15 |
| 5,750,972 A | 5/1998 | Botvin | ......................... | 235/379 |
| 5,754,653 A * | 5/1998 | Canfield | ........................ | 705/75 |
| 6,070,798 A | 6/2000 | Nethery | .................... | 235/462.01 |
| 6,073,121 A | 6/2000 | Ramzy | ........................... | 705/45 |
| 6,126,203 A * | 10/2000 | Dwork et al. | ................... | 283/62 |
| 6,170,744 B1 | 1/2001 | Lee et al. | ...................... | 235/380 |
| 6,173,272 B1 | 1/2001 | Thomas et al. | ................ | 705/42 |
| 6,233,340 B1 | 5/2001 | Sandru | ............................ | 380/51 |
| 6,285,991 B1 | 9/2001 | Powar | ............................. | 705/76 |
| 6,311,170 B1 | 10/2001 | Embrey | ........................ | 705/40 |
| 6,354,491 B2 | 3/2002 | Nichols et al. | ................ | 235/379 |
| 6,367,693 B1 | 4/2002 | Novogrod | ..................... | 235/379 |
| 6,390,362 B1 | 5/2002 | Martin | .......................... | 235/379 |
| 6,609,113 B1 | 8/2003 | O'Leary et al. | ................. | 705/39 |
| 6,729,539 B2 * | 5/2004 | Kim | ............................... | 235/379 |
| 7,028,886 B1 | 4/2006 | Maloney | ....................... | 235/375 |
| 2004/0098340 A1 * | 5/2004 | Schott et al. | .................... | 705/45 |
| 2005/0114264 A1 | 5/2005 | Torget et al. | .................... | 705/44 |

FOREIGN PATENT DOCUMENTS

WO    WO 00/70496    11/2000

* cited by examiner

*Primary Examiner* — Thien M Le
(74) *Attorney, Agent, or Firm* — Jonathan E. Szarzynski; Todd Baughman; Law Office of Jonathan E. Szarzynski, PLLC.

(57) ABSTRACT

A payment system is provided having an internet interface. In one embodiment, the payment system issues instruments having control codes. The system may issue a first portion of the control code, and retain a second portion of the control code for later issuance. Such later issuance activates the instrument. Some embodiments have a role-based security access scheme. For example, one embodiment provides a security verification score to be used in assigning user permissions on the payment system. Customer service representatives having different security permissions complete different portions of the security scoring and permission assignment process. Some embodiments have automated processing of security verification items submitted by users.

9 Claims, 20 Drawing Sheets

Validate an EMO

Please complete the following information:

EMO #: [        ] ~602
Amount: [        ] ~602
Control Code: [        ]

Please select the reason for this validation:

- Accepting ○ 603 — You are a business or individual accepting this EMO as a payment
- Depositing ○ — You are a financial institution representative accepting this EMO as a deposit to an account
- Cashing ○ — You are a financial institution representative accepting this EMO for cashing

If you are an US financial institution, enter your 9 digit routing (ABA) number.

Routing (ABA) #: [        ] ~602

If you are a non-US financial institution, enter your swift number.

Swift #: [        ]

If you are a Business or Individual, please enter the following information:

Business or Individual Name: [        ]
Phone #: [        ]

604
(Continue >>)

601

Sidebar:
Login
Get an Account
Activate Account
General Fee Schedule
Privacy Policy
F.A.Q.

Validate an EMO

Fig. 6A

© EMOcorp, 2004.

ostov@wisemet.com

Newly Submitted Verification Items

Number of Verifications displayed: [20] Page: [1] (Update) 1201

Results 1 - 20 of 32

| Submit Date | Name | User | Verification Doc | |
|---|---|---|---|---|
| 2004-10-08 | Test User | tRAINing@eMoCorP.cOm | Cancelled Check | Process |
| 2004-10-08 | Test User | tRAINing@eMoCorP.cOm | Cancelled Check | Process |
| 2004-10-08 | | | Credit Card | Process |
| 2004-10-08 | | | Utility Bill | Process |
| 2004-10-08 | | | Driver's License | Process |
| 2004-10-08 | | | Credit Card | Process |
| 2004-10-08 | | | Driver's License | Process |
| 2004-10-08 | | | Utility Bill | Process |
| 2004-10-08 | | | Utility Bill | Process |
| 2004-10-08 | | | Utility Bill | Process |
| 2004-10-08 | | | Postal Mail | Process |
| 2004-10-08 | | | Postal Mail | Process |
| 2004-10-08 | | | Postal Mail | Process |
| 2004-10-08 | | | ID Card | Process |
| 2004-10-08 | | | ID Card | Process |
| 2004-10-08 | | | ID Card | Process |
| 2004-10-08 | | | ID Card | Process |
| 2004-10-08 | | | ID Card | Process |
| 2004-10-08 | | | Driver's License | Process |
| 2004-10-08 | | | Passport | Process |

Search transactions posted between [-Month-] [-Day-] [-Year-] and 1202
[-Month-] [-Day-] [-Year-]

Show Advanced Search Options (Search)

© EMOcorp, 2004.

| CSR Permission Level: | Access: |
| --- | --- |
| 1. See Levels | -View the security verification scores of user accounts. |
| 2. Process | -Process submitted security verification items through Edit Security Verification Item screen.<br>-Assign confidence ranking. |
| 3. View | -View security verification scores of user accounts.<br>-View submitted security verification items.<br>-View assigned confidence rankings. |

Role-Based CSR Access Levels

Fig. 14

Admin User

User: William
Email: —
Account NOT Verified

1601

Profile   Login History   Verification   Comments   Ext Accounts   Permissions

1605

Assigned Roles in group Users:

| Deny | | Allow | |
|---|---|---|---|
| achCreditUser<br>achDebitUser<br><br>bulkPaymentsRole<br>creditCardFundingRo | 1602<br>>><br><<<br>1603 | | 1604 |

Select language for
the approval
message:

ENGLISH
SPANISH
FRENCH

Login Restrictions:

| Login Disabled | ☐ | (Update) |
|---|---|---|
| Intruder Lockout | No | (Reset) |
| ☐ Account has Expiration date | 2004-10-08 12:46:27 | (Update) |

© EMOcorp, 2004.

Fig. 16

MONETARY TRANSACTION SYSTEM AND METHOD

COPYRIGHT AND TRADEMARK NOTICE

A portion of the disclosure of this patent document contains material which is subject to copyright or trademark protection. The copyright or trademark owner has no objection to the facsimile reproduction by anyone of the patent document or the patent disclosure, as it appears in the Patent and Trademark Office patent file or records, but otherwise reserves all copyright and trademark rights whatsoever.

FIELD

The present invention relates to systems for monetary transactions, especially payment services having payer accounts for issuing payment instruments or negotiable instruments.

BACKGROUND

A variety of payment services exist. Some services provide electronic payment capabilities through Automated Clearing House (ACH) wire transfers or through proprietary electronic transfers conducted within a payment service system environment. Transactions conducted with such proprietary systems typically require both the payer and the payee in a transaction to have an account with the payment service used. Such services typically have a revenue model that takes a percentage fee from transfers within the system.

Some payment services provide paper money orders which may be negotiable. A typical paper money order system provides, however, no ability to make electronic transfers. Also, cancellation of a typical paper money order after issue usually requires a trip to a bank or waiting for papers to be mailed to the payment service and back. Further, many typical money orders are fully negotiable when issued, and may not have a named payee identified when issued. Such characteristics make typical money orders vulnerable to theft and fraud.

Some other types of payment systems are traditional checking accounts or credit and debit cards. Many consumers without a good credit history as well as those with low income are routinely denied credit cards. Many such consumers cannot obtain checking accounts that include debit cards. Some modern debit card systems may, however, provide accounts to such consumers. Debit system operators take, however, 2-3% or more in fees from the typical debit card transaction. Further, a debit card account is not suited for many payment scenarios. For example, typically only businesses are able to receive debit card payments. A consumer who needs to transfer money to another consumer and cannot deliver cash, cannot be served by the typical debit card system. Funding of a card is difficult as well.

Traditional payment systems are also quite vulnerable to fraud and theft. For example, typical credit card and checking systems do not conduct a pre-verification of transactions. Pre-verification processes may facilitate ease of use, trust, and transactions between remote parties. Further, the typical checking account arrangement provides opportunities for fraud using stolen and forged checks. Credit card numbers may be misappropriated at a business or on the internet. Many payment systems are exploited by dishonest customer service representatives or other administrators who enter or allow fraudulent transactions.

What is needed, therefore, is a payment system that allows electronic or paper transfers, provides negotiable and verifiable payment instruments, and allows for various types of transactions to be conducted between various parties while suppressing fraud.

SUMMARY

A payment system is provided having an internet interface. In one embodiment, the payment system issues instruments having control codes. The system may issue a first portion of the control code, and retain a second portion of the control code for later issuance. Such later issuance activates the instrument. Some embodiments have a role-based security access scheme. For example, one embodiment provides a security verification score to be used in assigning user permissions on the payment system. Customer service representatives having different security permissions complete different portions of the security scoring and permission assignment process. Such a process acts as a check and balance because it takes two or more people to activate various account features. Other embodiments include automated processing of security verification items submitted by users.

BRIEF DESCRIPTION OF THE DRAWINGS

FIG. 6A depicts a web page interface for a payment service devised in accordance with a preferred embodiment of the present invention.

FIG. 12 depicts an exemplar queue of submitted verification items from users of a payment system according to one embodiment of the present invention.

FIG. 13 depicts one exemplar view of an edit screen for a CSR to edit a verification item record in a preferred embodiment of the present invention.

FIG. 14 shows a table of customer service representative access levels under a role-based security system according to one preferred embodiment of the present invention.

FIG. 16 depicts a Customer Service Representative (CSR) administration screen according to one embodiment of the present invention.

DETAILED DESCRIPTION OF PREFERRED EMBODIMENTS

Figure 1:
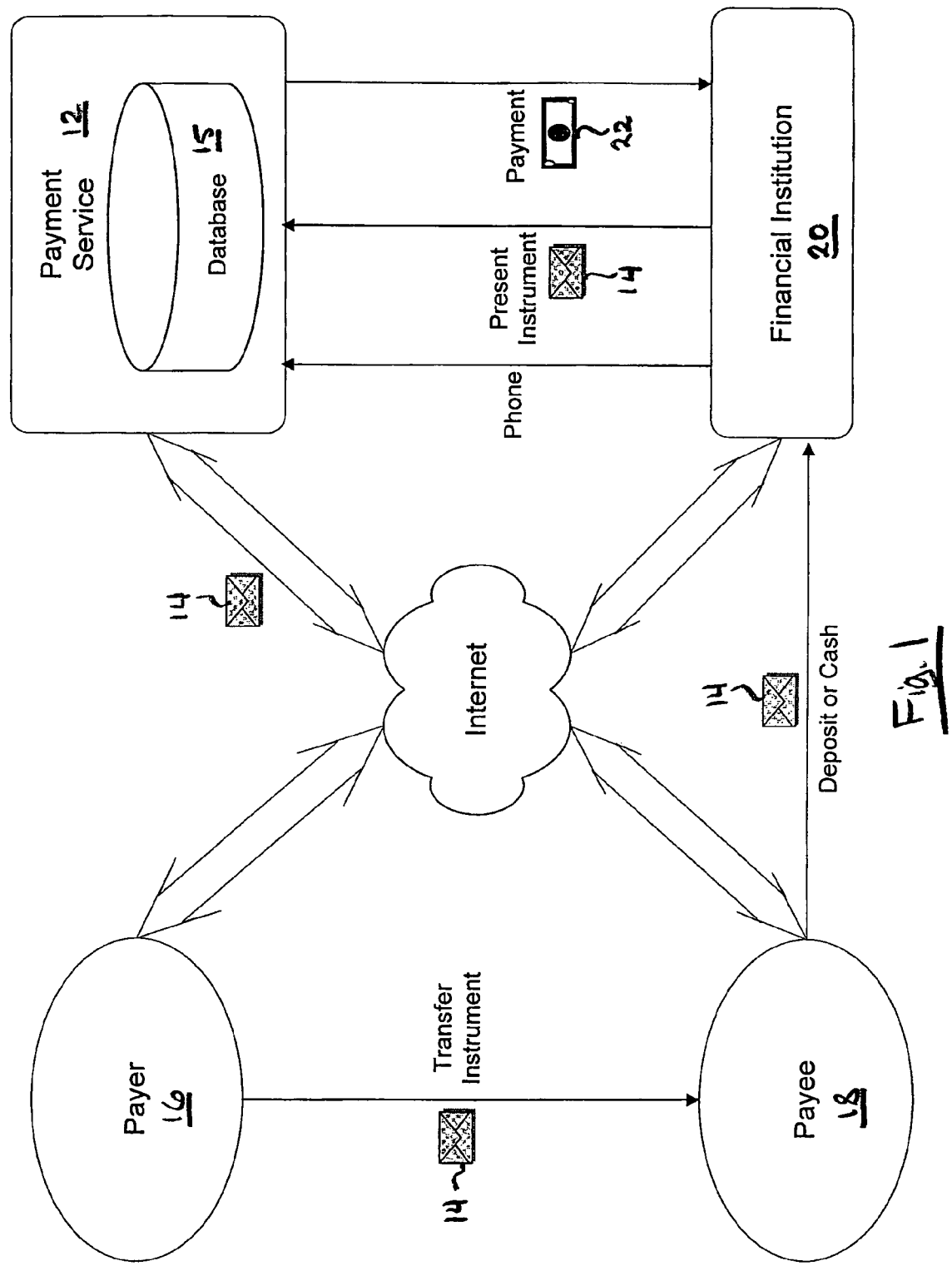
FIG. 1 is a block diagram depicting a payment process employed by a payment system devised in accordance with an embodiment of the present invention.

FIG. 1 depicts a block diagram of an operation process of a payment system according to one embodiment of the present invention. Payment service 12 has database 15 containing account information for a payer 16. Payer 16 obtains an account with payment service 12 as further described with reference to FIG. 10. Payment service 12 will hold money for payer 16 and a issue payment instrument 14 ("instrument", "financial instrument") in response to valid commands from payer 16.

As an example, payer 16 may be a consumer who wants to make a purchase from payee 18, who may be a vendor. To conduct such a transaction, payer 16 requests an instrument 14 from payment service 12. Such a request is typically over the internet, although other communication media may be used. Payment service 12 typically transmits instrument 14 to payer 16 in electronic form. Such transmission may be referred to as "issuing" instrument 14, even though instrument 14 is typically not negotiable immediately after issuance to payer 16. Instrument 14 typically needs to be activated as further described with regard to later-referenced Figures.

Payer 16 transfers instrument 14 to payee 18. This may be done electronically, or payer 16 may print instrument 14 and physically transfer instrument 14 to payee 18. Payee 18 will typically want to verify that instrument 14 is valid before trying to deposit or cash instrument 14 with a bank or other financial institution 20. Payee 18 may contact payment service 12 to validate instrument 14. Such validation may occur by phone, internet, or other communications media. Such validation is further described with reference to FIGS. 5-7.

Payee 16 will typically deposit or cash instrument 14 with financial institution 20. In this embodiment, a cashier at financial institution 20 will 20 typically verify that instrument 14 is valid before accepting it. The cashier may access payment service 12 over the internet or over the phone. Payment service 12 will respond to requests regarding validity of instrument 14 as further described with reference to FIGS. 5-7. After validation, financial institution 20 presents instrument 14 to payment service 12 (or a representative financial institution of payment service 12) for clearance and settlement through normal financial channels. Payment service 12 validates instrument 14 again, and renders payment 22 upon successful validation of instrument 14.

Those of skill will recognize that the acting parties depicted in FIG. 1 are merely exemplar and that a variety of other systems and transactional scenarios may occur. For example, payee 18 may transfer instrument 14 to other payees. Payer 16 may designate itself as payee on the instrument. Other financial institutions may be involved in the presentment, clearance, and settlement process. A payee may have an account with payment service 12 that allows direct settlement of instrument 14 into that account without using financial institution 20.

Figure 2:
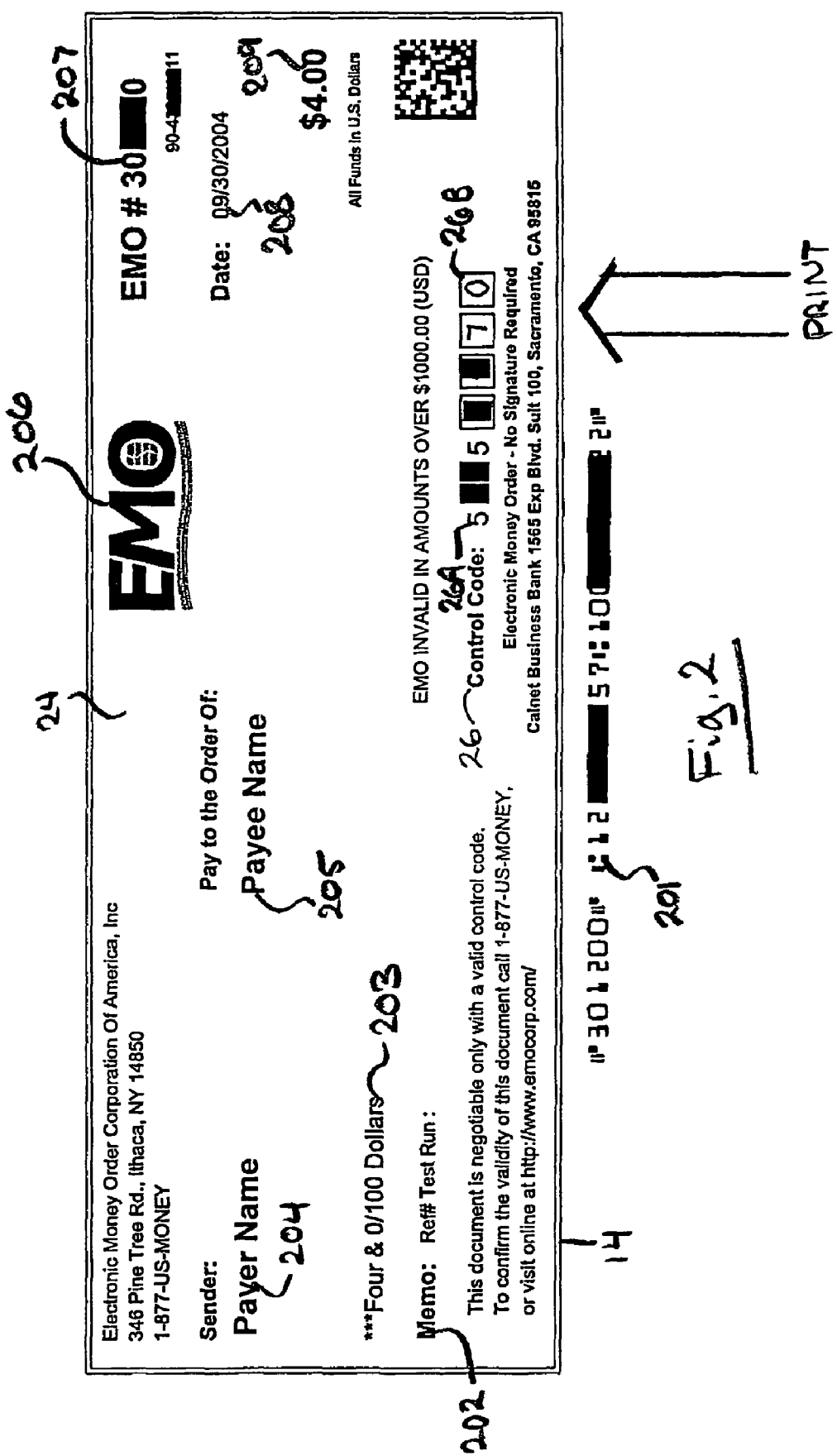
FIG. 2 depicts the face of a financial instrument according to one embodiment of the present invention.

FIG. 2 depicts the face 24 of a financial instrument 14 according to one embodiment of the present invention. While depicted face 24 is arranged similarly to a typical printed check, this is merely exemplary and other embodiments may have other layouts. Further, instrument 14 may be transferred and/or presented electronically in some instances, and it is not necessary for some transaction scenarios for instrument 14 to ever be rendered in a tangible form such as a paper instrument.

In this embodiment, face 24 of instrument 14 has control code 26, which is divided into an issued portion 26A ("first portion", "preprinted portion") and activation portion 26B ("second portion", "validation portion", "fill-in portion"). In this embodiment, the total length of control code 26 is 8 digits. Payment service 12 issues instrument 14 with first portion 26A having only four digits of the eight central code digits specified. Although, both portions 26A and 26B of control code 26 are, in a preferred embodiment, generated together by payment service 12, portion 26A and 26B are issued or disclosed outside of the system at different times. Payment service 12 typically issues second portion 26B at a later time consisting in this example, of four digits to accompany the four already specified digits of control code 26A. Instrument 14 will not be honored by payment service 12 without the entire control code 26. Further, instrument 14 will typically not be negotiable without the entire control code 16. The issuance of instruments 14 and control codes 26 are further described with reference to FIGS. 3 and 4.

Payer 16 may enter second portion 26B of control code 26 in the appropriate field. Alternatively, Payer 16 may transfer instrument 14 without second portion 26B and later forward second portion 26B. While instrument 14 is depicted with blank boxes for filling in second portion 26B, other embodiments may have other indications of data fields, and the instrument may be stored and/or transferred entirely electronically or on paper. Further, the electronic form of the instrument may take a variety of forms such as, for example, an electronic image, a set of data fields, a database entry, and a formatted or unformatted text document.

Depicted are MICR (Magnetic Ink Character Recognition) font characters 201 which typically contain a bank routing number and account number. Such numbers may take other forms as part of the instrument, but will typically be presented as MICR when an instrument 14 is intended to be printed and deposited at a bank. In this embodiment, face 24 has other features such as memo field 202, amount in words field 203, payer or sender information field 204, payee field 205, company logo 206, instrument number 207, date field 208, and amount field 209.

In a preferred embodiment, instrument 14 is printed on pre-printed security paper or on plain printer paper. Pre-printed security paper may be issued in different versions having different payment limits. Preferably, paper is inserted in the printer such that MICR characters 201 are printed first, in a manner devised to properly align and position MICR characters 201 with respect to the edge of the printed instrument 14. Such a print direction is depicted by the arrow marked "PRINT". Other embodiments may have other printing methods such as traditional check printers. Still other embodiments may have instruments 14 that are not printed, but instead transferred electronically.

Figure 3:
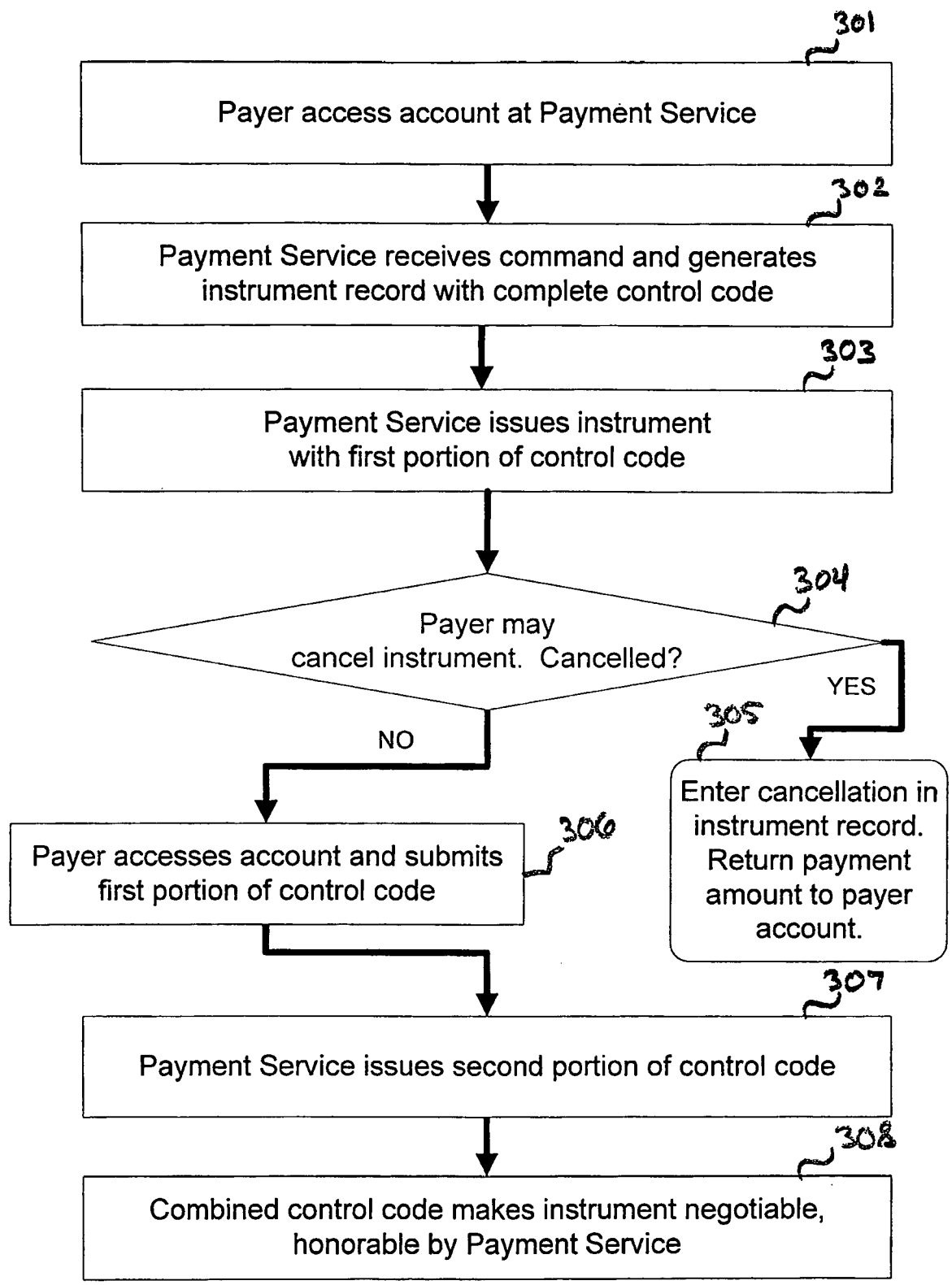
FIG. 3 depicts a flow chart for an instrument issuance according to one embodiment of the present invention.

FIG. 3 depicts a flow chart for an instrument issuance according to one embodiment of the present invention. In step 301, payer 16 accesses their account at payment service 12. Such access is preferably done by logging in to a secured website. In step 302, payment service 12 receives a command from payee 16 to issue an instrument 14. The command includes a payment amount and preferably includes other data such as payee name and address. In response to the command in step 302, payment service 12 generates an instrument record and a control code 26. The control code 26 generated in step 302 is complete with first portion 26A and second portion 26B. Payment service 12 stores both first and second portions, but only issues first portion 26A at this step.

In the process according to this embodiment, at step 303 payment service 12 issues instrument 14. Issuance includes transmitting the various instrument data fields, such as those depicted in FIG. 2, to the payee. Issuance in step 303 typically does not, however, include transmittal of second portion 26B of control code 26. Such issuance may be made in any form in which instrument 14 may be embodied, such as, for example, paper or electronic image. Issuance of an electronic image of instrument 14 through a web page is preferred.

After issuance of instrument 14, and before issuance of second portion 26B of control code 16 (step 307), there typically a period of time in which instrument 14 is issued but not activated. During this period of time, payer 16 may choose to cancel instrument 14. In step 304, if payer cancels instrument 14, the cancellation is recorded in step 305 and the payment amount is returned to payer 14's account at payment service 12. A cancelled instrument 14 will not be honored by payment service 12.

If no cancellation occurs, the next event in the process is step 306 when payer 16 decides to activate instrument 14. Payer 14 submits first portion 26A to payment service 12 and indicates desire to activate instrument 14. Next in step 307 payment service 12 issues second portion 26B of control code 26 and activates the instrument record for instrument 14. Such issuance is preferably done by transmitting portion 26B to payer 16 over a secured website hosted by payment service 12. At this point, payer 16 typically can no longer cancel instrument 14.

Payer 16 may choose to transmit or transfer instrument 14 to a payee before instrument 14 is activated in step 307. In such a scenario, payer 16 would typically send the second portion 26B of control code 26 to payee 18 for payee 18 to use in validating and depositing instrument 14. Payer 16 may also enter second portion 26B into the appropriate field of instrument 14 to make it negotiable. In one preferred form, instrument 14 is printed and second portion 26B handwritten on face 24 of instrument 14.

Figure 4:
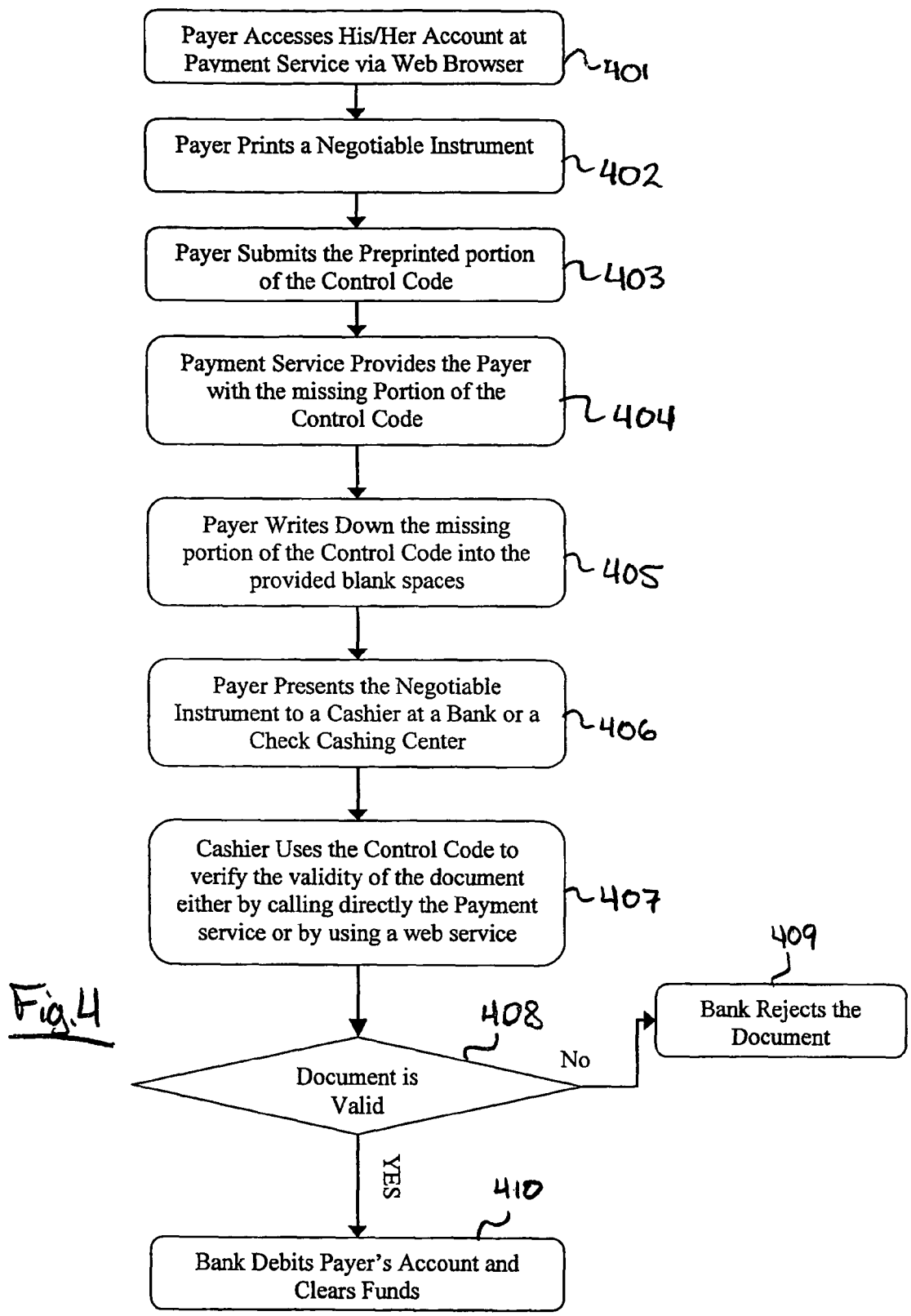
FIG. 4 depicts a flow chart of one example transaction scenario according to one embodiment of the present invention.

FIG. 4 depicts a flow chart of one example transaction scenario according to one embodiment of the present invention. In step 401 payer 16 accesses his account at payment service 12 similarly to FIG. 3. In step 402, payer 16 prints an instrument 14 requested through payment service 12. Instrument 14 has all data needed to be negotiable except the second portion 26B of control code 26. Payer 16 may send or transfer instrument 14 at this point to a payee. In this depicted scenario, payer 16 will present instrument 14 to a bank, so payer 16 will also act as a payee 18.

Payer 16 may wish to store or carry instrument 14 in un-activated form before activating with second portion 26B. In this sense, instrument 14 may be used similarly to a traveler's check. When payer 16 wishes to activate instrument 14, they log onto the payment service and present portion 26A of control code 26 (step 403). In this embodiment, portion 26A is pre-printed on instrument 14. Preferably, payer 16 submits portion 26A through a secure website provided by payment service 12. Next, in step 404, payment service 12 provides second portion 26B of control code 26. In step 405 payer 16 writes down portion 26B in blank fields on face 24 of instrument 14. This embodiment may use an instrument 14 similar to that depicted in FIG. 2.

In step 406, payer 16 presents instrument 14 to a bank or check cashing center. In step 407, the bank cashier validates the instrument using control code 26 and other data on instrument 14. In step 408, payment service 12 returns an indication of validity or invalidity to the bank teller. An invalid instrument 14 is rejected by the bank in step 409. A valid instrument 14 is accepted by the bank and presented to payment service 12 to debit payer 16's account in step 410.

Figure 5:
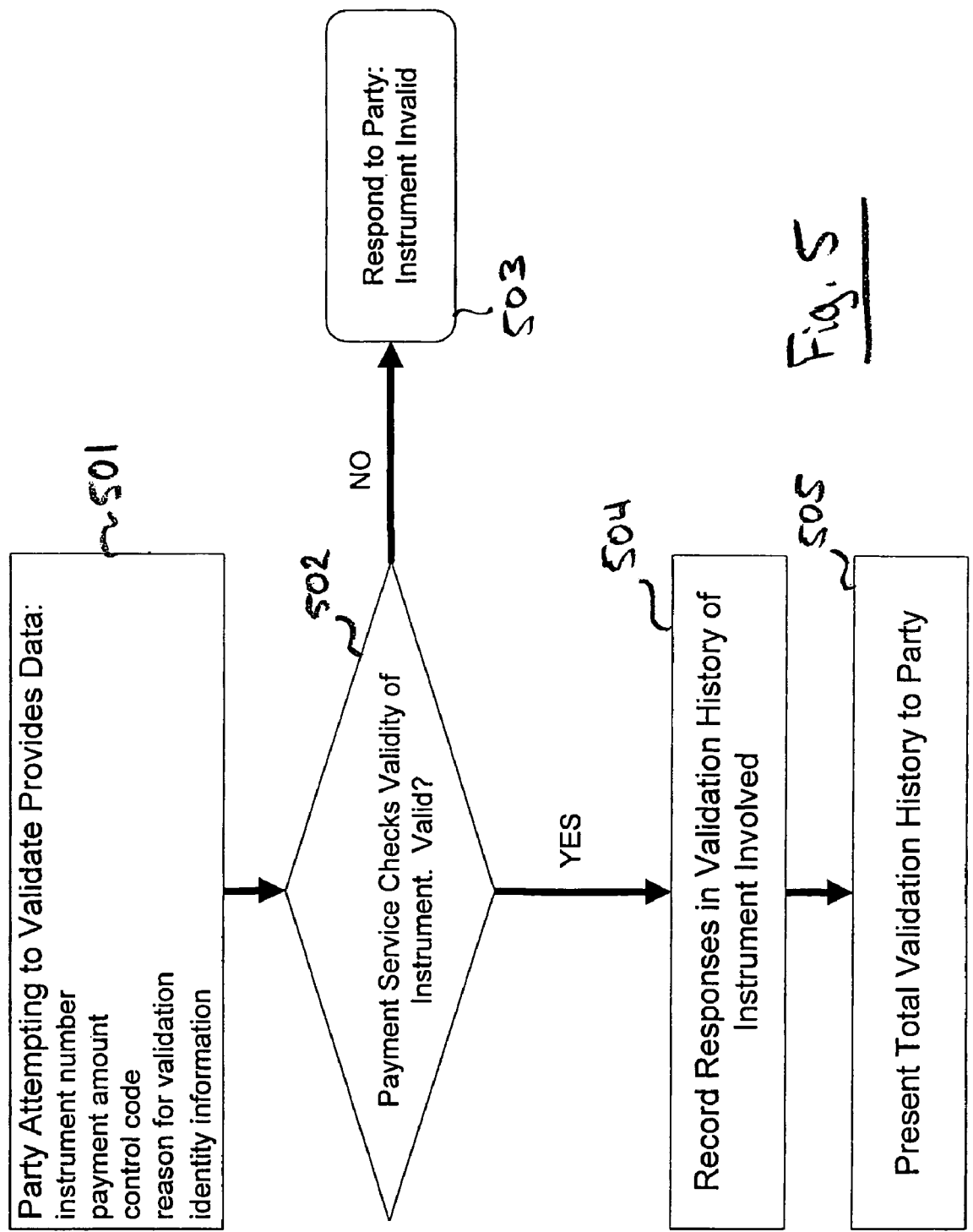
FIG. 5 depicts a flow chart of one validation scenario according to one embodiment of the present invention.

FIG. 5 depicts a flow chart of one validation scenario according to one embodiment of the present invention. A party, which may be a payee 18 or a bank cashier or other employee of a financial institution 20, connects to payment service 12 to validate instrument 14. In this embodiment, the validation process has step 501 in which the party provides certain data to payment service 12. An exemplar web interface for providing such data is depicted in FIG. 6A. In step 502, payment service 12 compares the received data to its stored instrument record. Payment service 12 returns a response for an invalid instrument 14 in step 503. If payment service 12 determines that the instrument 14 in question is valid, it will store the data submitted in a record in database 15 associated with instrument 14 (step 504).

Payment service 12 returns a response for a valid instrument 14 in step 505. Such response may be referred to as verifying or validating instrument 14. Preferably, the response returned in step 505 is the complete validation history of the particular instrument 14. For example, if a bank cashier is validating an instrument 14 that has already been presented as payment to a payee 18, step 505 will present such a fact to the cashier.

Figure 6B:
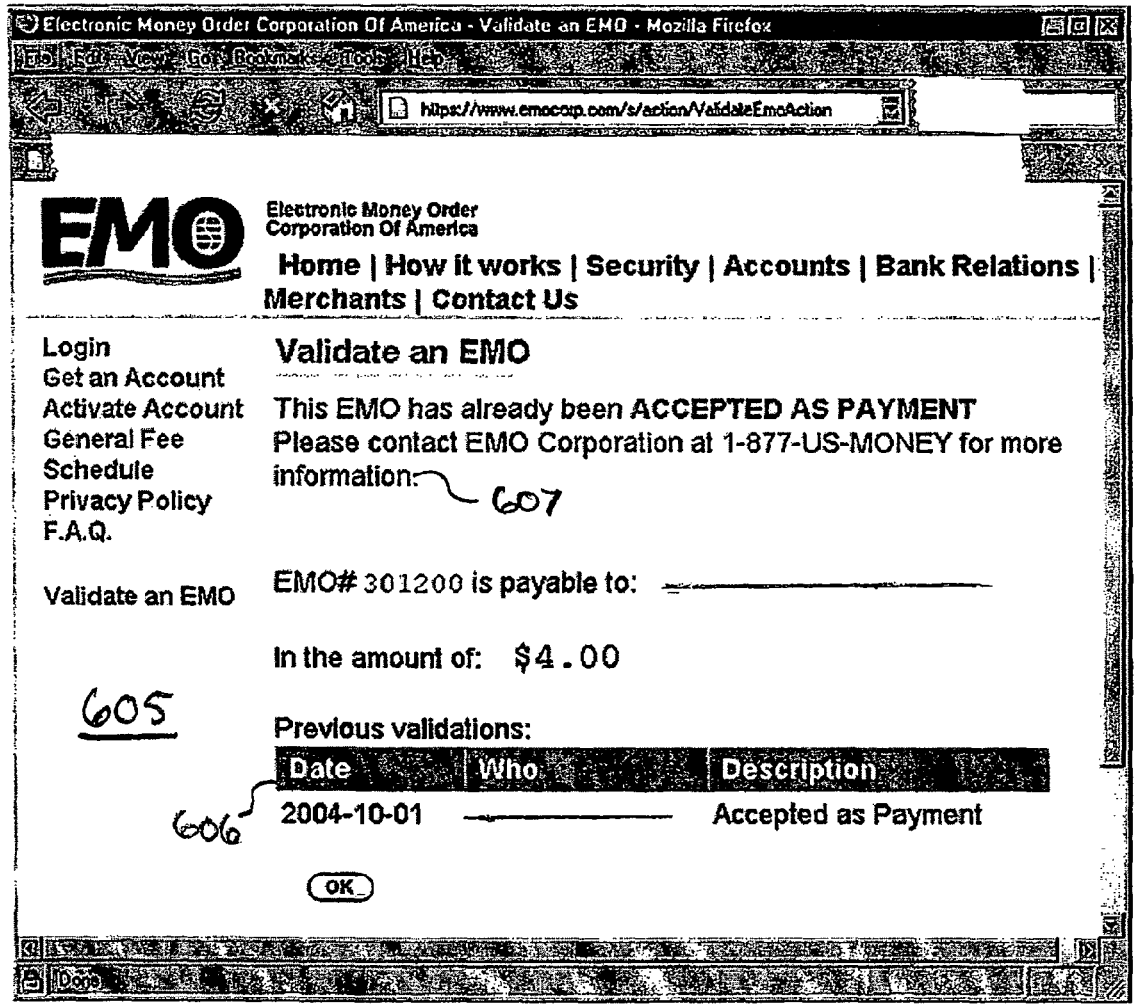
FIG. 6B depicts a user validation web page according to one preferred embodiment of the present invention.

FIG. 6A depicts a web page interface 601 for a payment service 12 according to one preferred embodiment of the present invention. Web page interface 601 is, in the depicted embodiment, an interface for validating an instrument 14 remotely. Such validation may also be done over telephone or other connection to payment service 12. In this embodiment, web page interface 601 has data fields 602 for entering data such as the instrument number, depicted as EMO # (Electronic Money Order number). EMO and the depicted logos in FIG. 6B and other web page screenshots are trademarks of Electronic Money Order Corporation, Inc.

Web page interface 601 may further have radio or radial buttons 603, or other types of software interfaces. The depicted radial buttons 603 are for submitting an answer to one of the depicted questions regarding the reason for validation. The choices depicted are "Accepting—You are a business or individual accepting this EMO as a payment"; "Depositing—You are a financial institution representative accepting this EMO as a deposit to an account."; and "Cashing—You are a financial institution representative accepting this EMO for cashing." Other questions and responses may be used. A submission button 604 marked "continue" submits the data from web page interface 601 to payment service 12.

FIG. 6B depicts a validation response web page according to one preferred embodiment of the present invention. In this embodiment, screen 605 shows a response for an instrument 14 that has already been accepted as payment before the user 18 attempts to validate it for acceptance as payment (710 on FIG. 7). Screen 605 presents validation history 606 and message 607 to the user. Portions have been redacted to simplify the drawing. Other embodiments may allow for multiple users to transfer in a payment series in which a negotiable instrument is transferred to more than one payee 18 before being presented at a financial institution 20 for payment. Such validation may track the payee name and payer name of each transaction.

Figure 7:
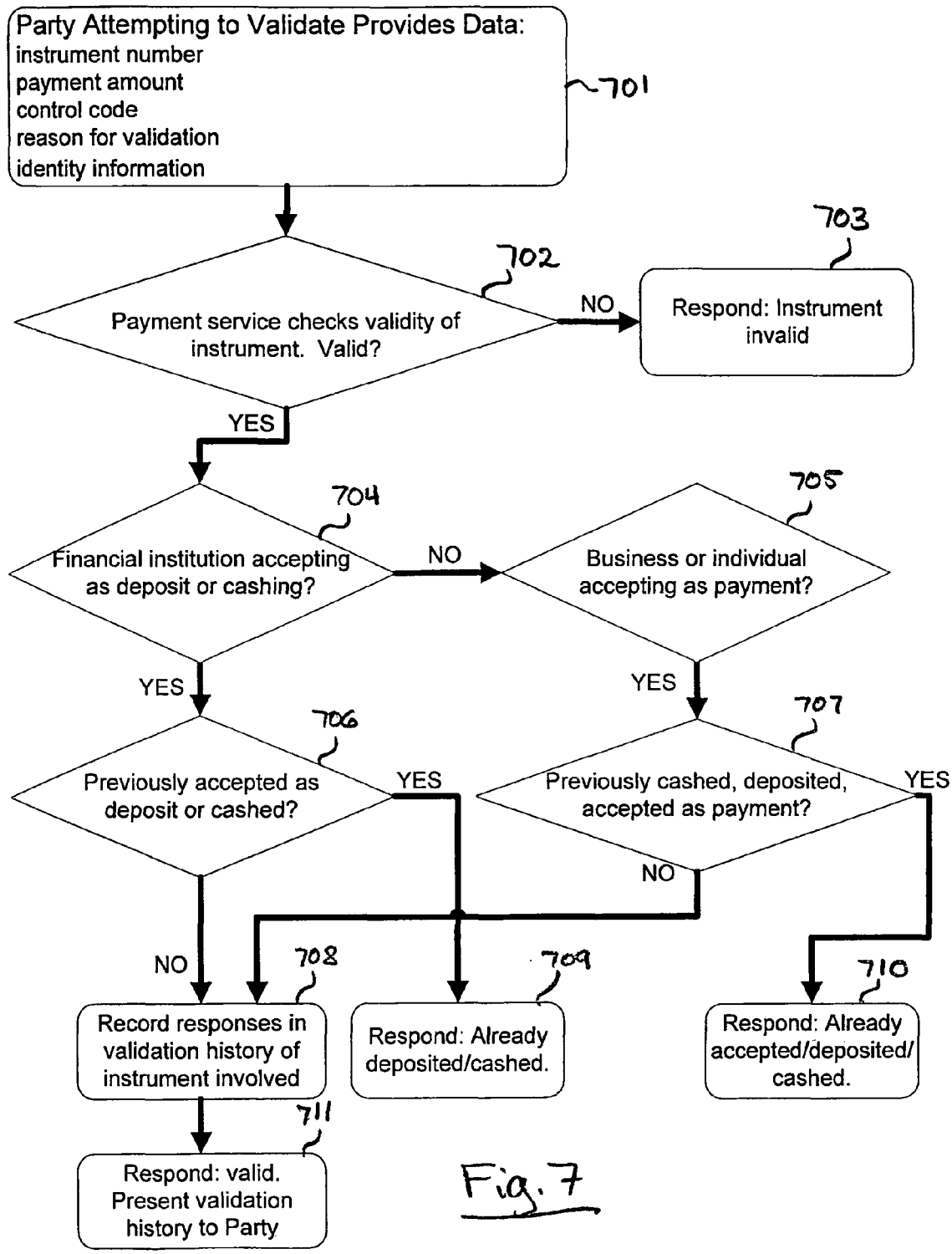
FIG. 7 depicts an exemplar flow chart for a validation process according to one embodiment of the present invention.

FIG. 7 depicts an exemplar flow chart for a validation process according to one embodiment of the present invention. In step 701, a party provides data to payment service 12 to begin the validation process for a particular instrument 14. The party may be a payee 18 or a financial institution 20, for example. The data may be provided to payment service 12 by submission over a web interface 601 (FIG. 6), or relayed over a phone call or other communications means, such as, for example, a proprietary software client configured to communicate directly with an internet server at payment service 12. The party may submit more or less data than the data items listed in step 701, which depicts a preferred embodiment.

After the party submits data in step 701, payment service 12 checks validity of instrument 14 in step 702. Such a check involves checking for completeness of the data submitted, checking for the existence of a payment record with the submitted instrument number, and matching the control code and payment amount with the payment record. A mismatch or a non-existent payment record will route the process to step 703, which responds to the party that the instrument 14 is invalid. If step 702 determines the instrument 14 is valid, step 704 checks the party-submitted data from step 701 to determine if a financial institution is accepting instrument 14. If so, step 706 checks for a previous instance of such acceptance, and responds that instrument 14 has already been accepted (step 709) or records the party responses (the data submitted in step 701) in the payment record (step 708) and presents the validation history of the instrument to the party (step 711).

If the submitting party is not a financial institution (step 704), the process in step 705 checks to see if the party is accepting instrument 14 as payment. In this embodiment, steps 704 and 705 represent two options for processing. Other embodiments may have other options. Next, step 707 checks if instrument 14 has previously been accepted for payment, deposited, or cashed. If so, a response indicates such to the party. If not, the process branches to step 708.

Figure 8:
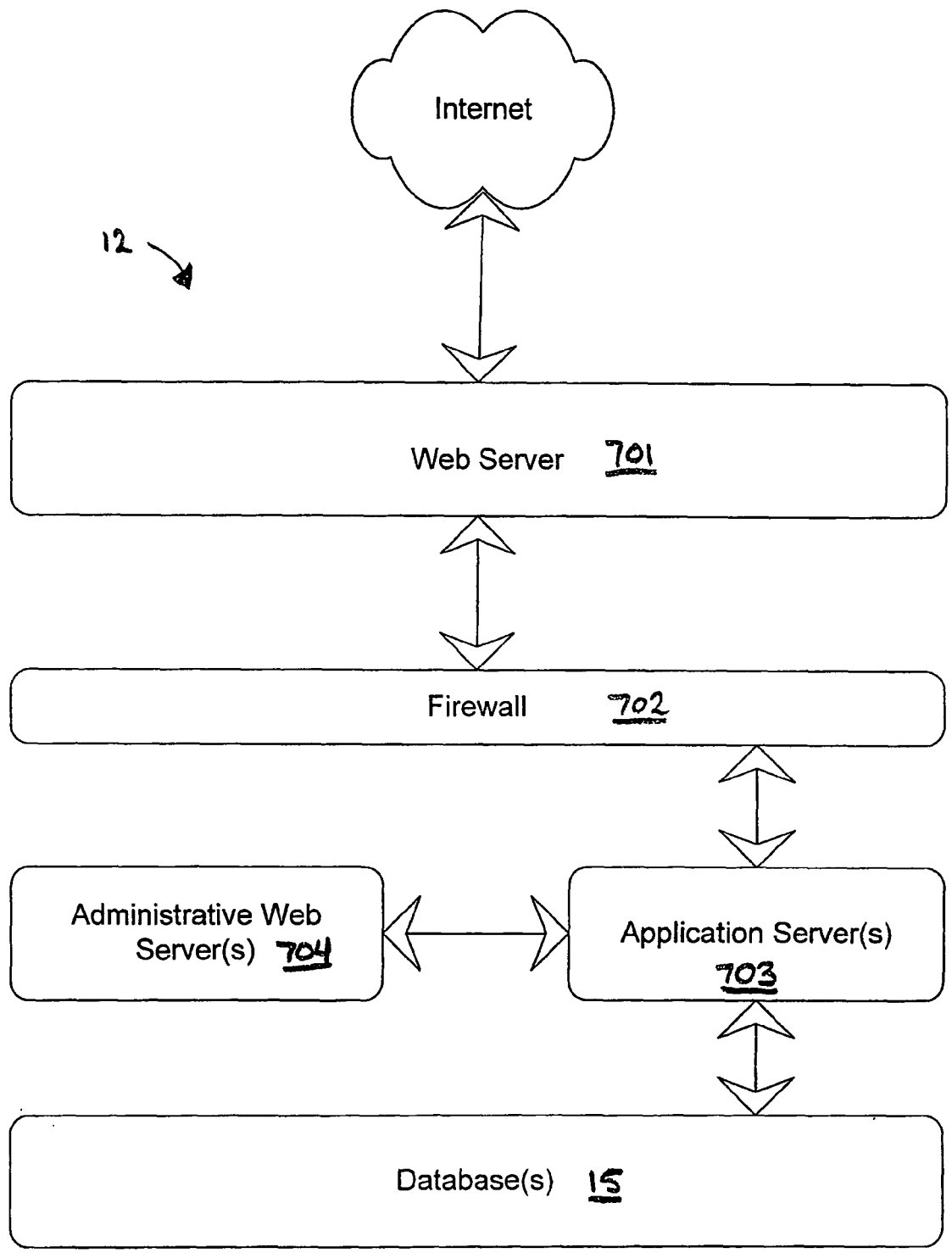
FIG. 8 depicts a block diagram system architecture of a payment system according to one embodiment of the present invention.

FIG. 8 depicts a block diagram system architecture of a payment system 12 according to one embodiment of the present invention. Payment service 12 has a web server 701, which preferably presents a web interface for use with a standard internet browser. Server 701 may also present a proprietary interface for a client software to access payment system 12 over the internet. Web server 701 will typically have security protection with only needed ports enabled for communication with the internet. Firewall 702 separates web server 701 from applications servers 703 and databases 15. Preferably, administration of payment system 12 is performed through administrative web servers 704. While only one block is shown for each element in the architecture, the depicted elements are typically housed on redundant machines and may be housed across multiple facilities.

Figure 9:
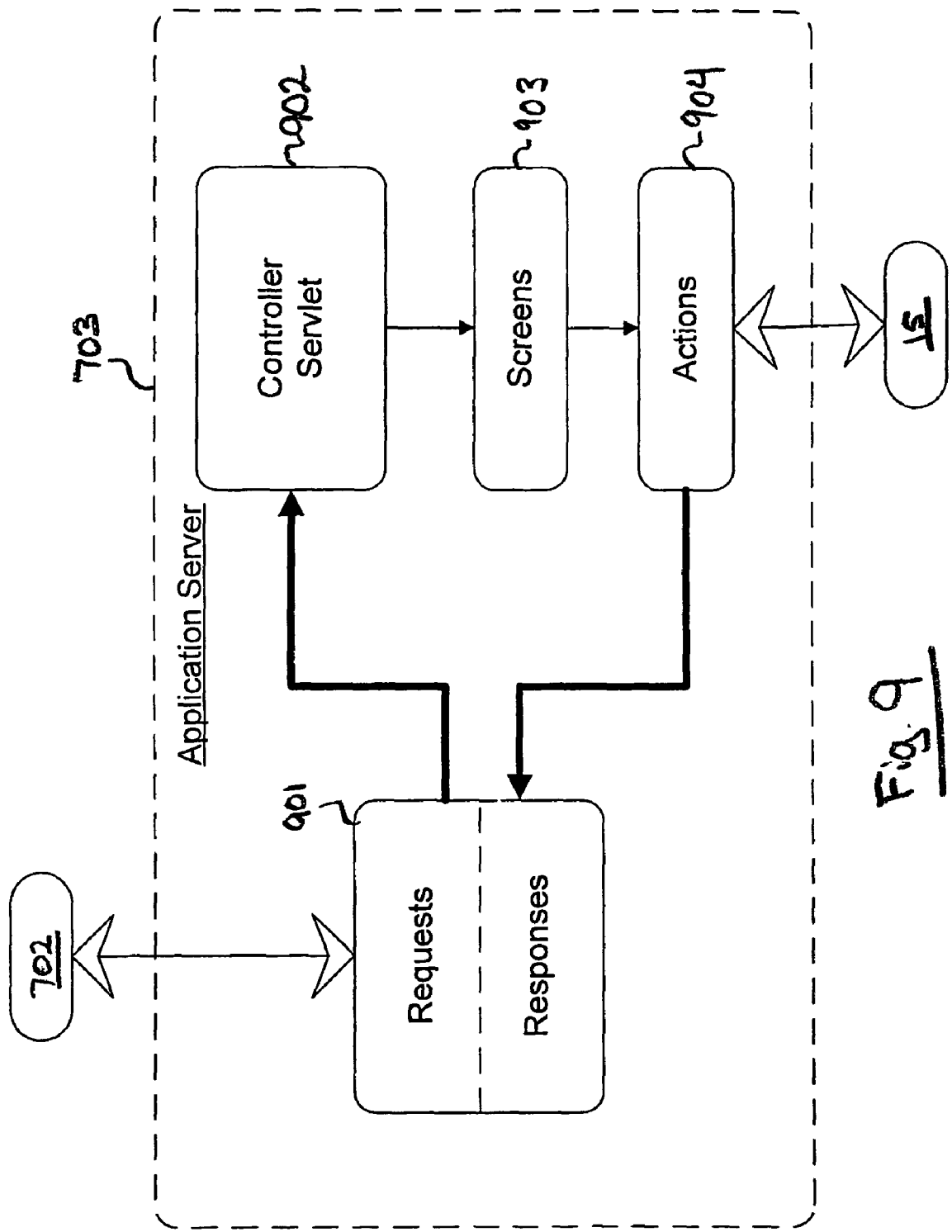
FIG. 9 depicts a module-level block diagram of an application server according to one embodiment of the present invention.

FIG. 9 is a module-level block diagram depiction of an application server 703 according to one embodiment of the present invention. In this embodiment, application server 703 is implemented according to a Model-View-Controller (MVC) design paradigm. Firewall 702 connects to web server 701 and presents views to the system users. Preferably, administrative servers 704 also connect to application server 703 similarly to firewall 702.

In this embodiment, interface 901 presents user requests and 20 responses through screens presented on user web browsers. User requests are routed to controller servlet module 902, which implements flow control, deciding what routines to invoke through commands to view module 903 and model module 904. View module 903 generates interface screens. Model module 904 takes actions that access or change the data store in database 15. Such an action may be, for example, a routine to generate a new instrument, which routine may invoke other subroutines or algorithm portions such as, for example, a control code generator module or subroutine to generate a control code 26 for an instrument. Model module 904 also runs other code and algorithms. In another example, a control code verifier action may check validity of a received control code, and send responses and/or a validation history to a user. In such an embodiment, the control code verifier receives data submitted from the party attempting to validate an instrument (FIG. 5). Actions and/or modules and subroutines may have access to data in one or more portions of database 15.

Figure 10:
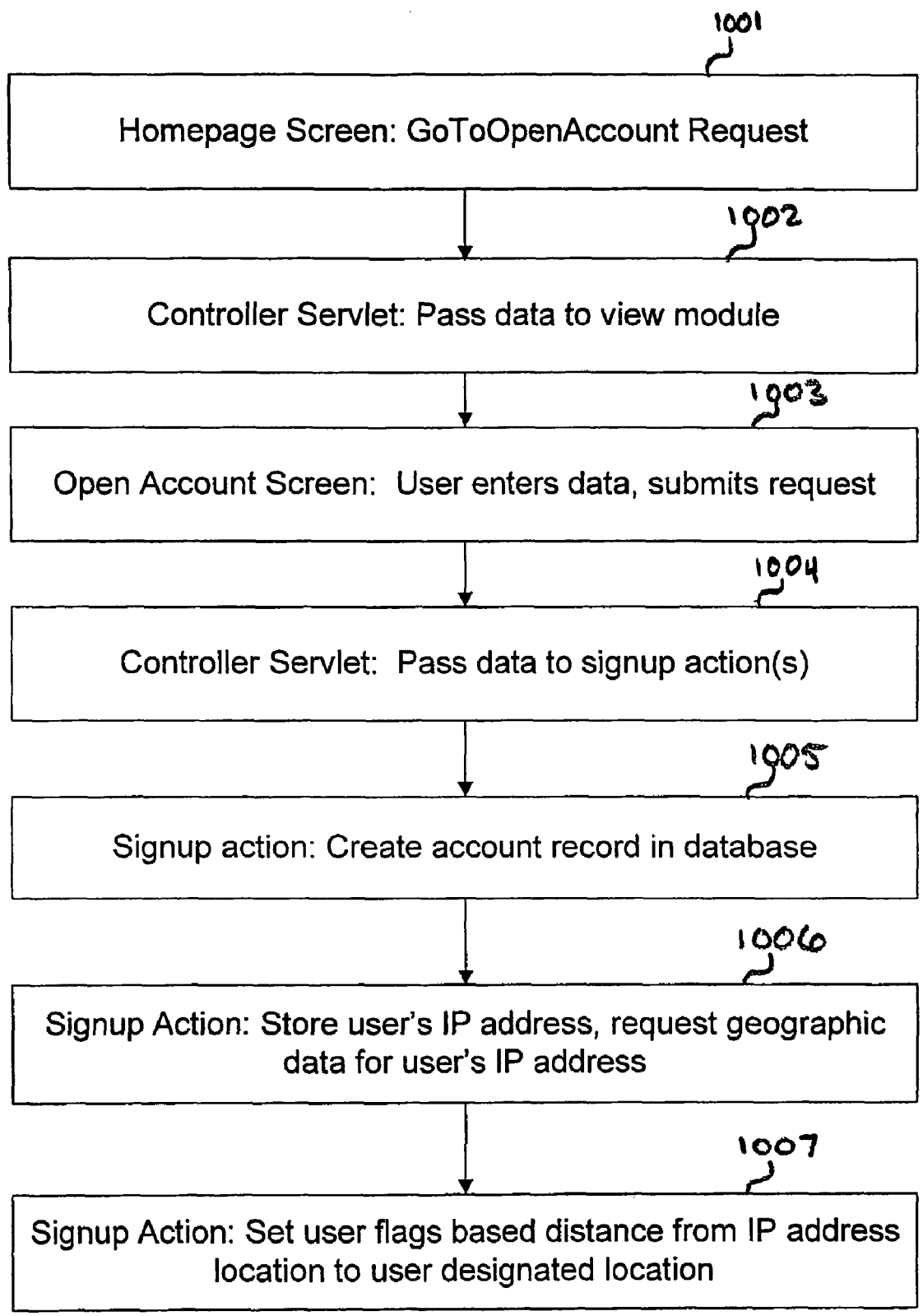
FIG. 10 depicts a flow chart of a process for creating a new user account according to one embodiment of the present invention.

FIG. 10 depicts a flow chart of a process for creating a new user account according to one embodiment of the present invention. In this embodiment, a request over web interface to open a new account, step 1001, is processed by controller servlet 902, which calls an appropriate screen from the view module in step 1002. The prospective user enters their account data at the open account screen and submits it via a request in step 1003. Controller servlet 903 receives the request, with account data, performs checking and flow control, and passes the data to the signup action in step 1004. The signup action creates an account record in database 15 (step 1005).

In this embodiment, in step 1006, the signup action stores the user's IP address and requests geographic coordinates corresponding to the IP address. Such coordinates are, in this embodiment, used to perform one security verification regarding the user's access to capabilities of payment system 12. In step 1007, the signup action calculates the distance from the coordinates of the user's submitted address to the returned coordinates corresponding to the user's IP address. Such distance is normalized based on the country of origin and other factors which may introduce variance in the two sets of coordinates. The normalized value is used to set one security verification item value for the user account. Other security validation items may be used. Such items are preferably combined and weighted to achieve weighted security verification score, as further described with regard to below-referenced Figures.

Figure 11:
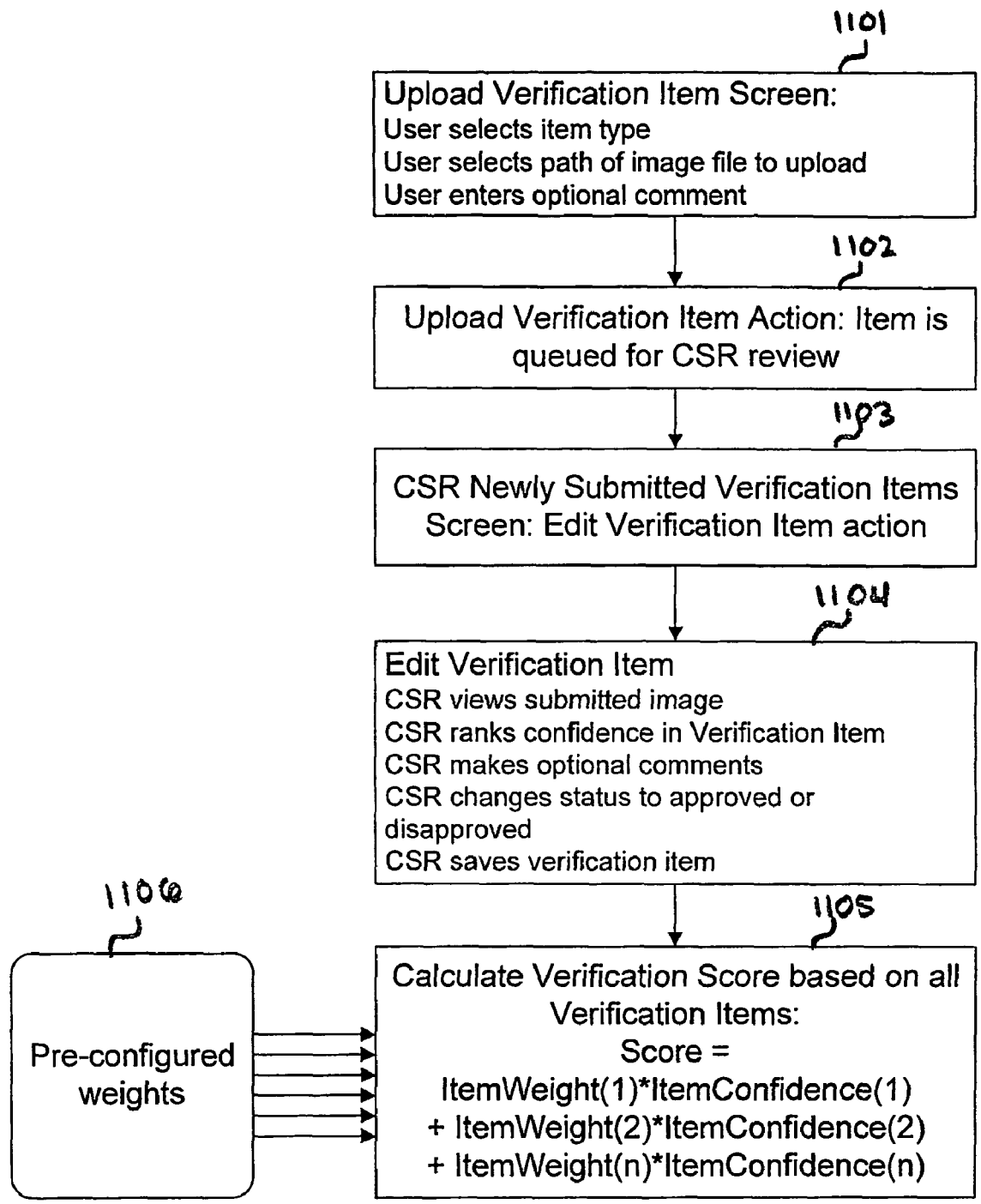
FIG. 11 depicts a security verification process according to one embodiment of the present invention.

FIG. 11 depicts a security verification process according to one embodiment of the present invention. Step 1101 presents a screen where users may upload an item for entry in their account record as a security verification item. The item is preferably submitted as an image file, but other types of data may be used. Examples of submitted security verification items are images of a passport, a utility bill, a credit card, and a credit card authorization form. Many other verification items are preferably used as well.

Figure 13:
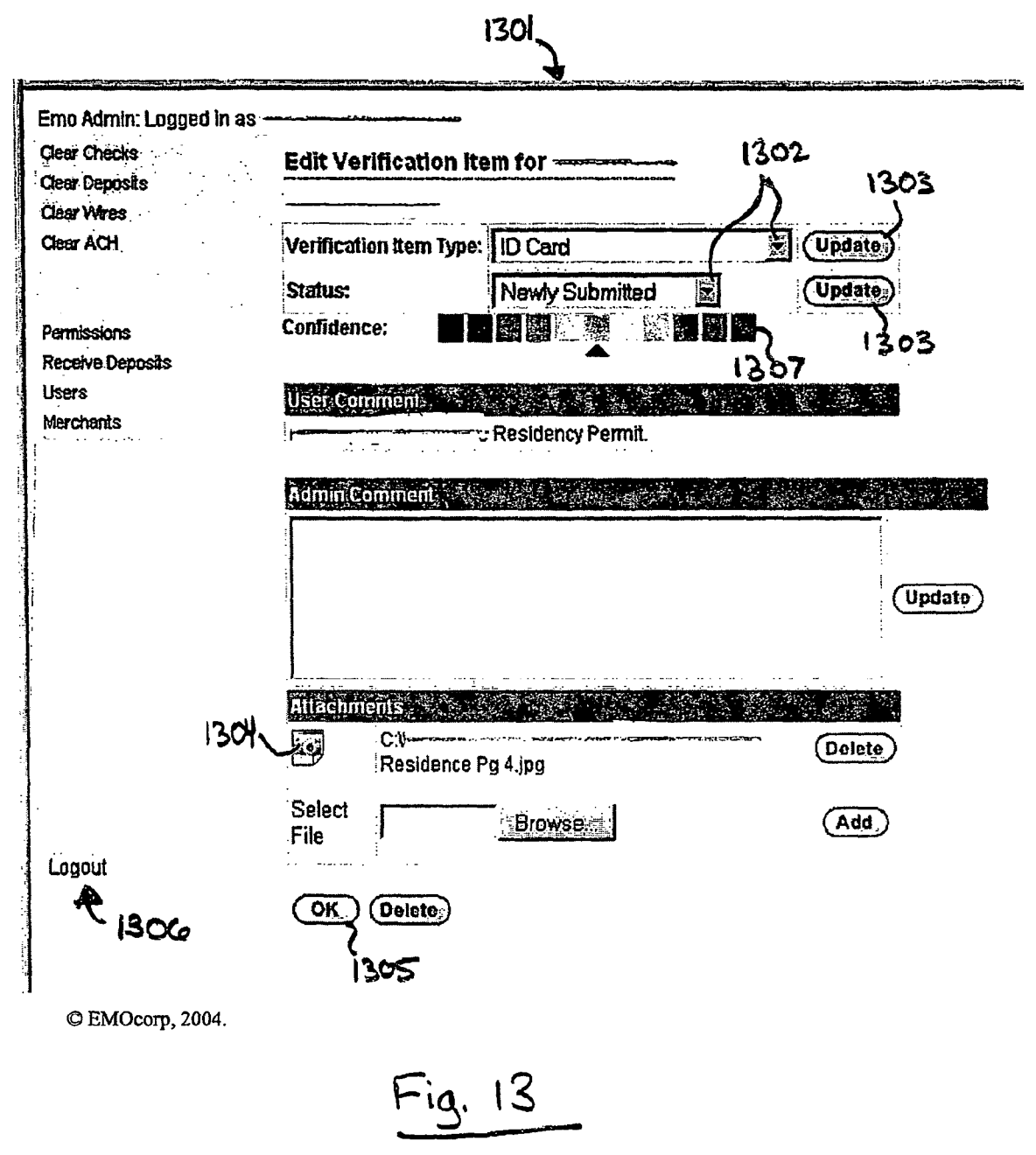

In this embodiment, in step 1102, controller servlet 902 passes submitted data from the user to an upload verification item action, which creates a data record for the uploaded verification item and enters a link to the record in a pending queue for customer service representatives (CSRs) of payment service 12 to examine and edit. FIG. 12 depicts one exemplar view of a queue interface screen for a CSR to view submitted verification items. FIG. 13 depicts one exemplar view of an edit screen for a CSR to edit a verification item record.

Referring to FIG. 11, in this embodiment, a CSR requests access to a certain verification item record in step 1103. Such a request is submitted by, for example, selecting a link 1202 (FIG. 12) to the desired record from the Newly Submitted Verification Items queue 1201. The request in step 1103 is checked for proper security access, which is preferably according to a role-based access scheme as further described with reference to FIG. 14. If access is verified, step 1104 presents an Edit Verification items screen such as the exemplar screen 1301 depicted in FIG. 13.

In this embodiment, at the depicted Edit Verification Items screen 1301, the CSR clicks on link 1304 to view the submitted verification item (step 1103). Preferably, link 1304 activates a new window with a view of the submitted image or data from step 1101 and 1102. In step 1104, the CSR verifies the submitted item according to training of various processes and human judgment. The CSR ranks the item on a confidence ranking entry button 1307. The confidence level entered may be determined according to criteria such as, for example, consistency with other entered data and security verification items, and validity of the item. Continuing with reference to step 1104, the CSR may enter optional comments about the item. The CSR updates the status of the security verification item using menus 1302 and buttons 1303. After processing, the status may be "processed" or "rejected." The CSR then saves the security verification item data record using button 1305.

After the CSR saves the edited security verification item, step 1105 calculates a verification score. Such calculation preferably employs each security verification item that has processed for the particular user in question. A set of pre-configured weights 1106 are also inputs to the verification score calculation. The calculation sums each item times its respective pre-configured weight 1106 over the set of verification items to obtain the verification score. The score is saved in the users account record in database 15, and used to determine user access to features of payment system 12.

FIG. 12 depicts an exemplar queue of submitted verification items from users of payment system 12. To simplify the drawing, parts of the list have been redacted. Queue 1201 contains submitted items submitted in sequential time order. Other orders may be used. Links 1202 direct CSRs to the editing screen depicted in FIG. 13.

FIG. 13 depicts one exemplar view of an edit screen for a CSR to edit a verification item record. Screen 1301 has navigation menu 1306, which typically appears in other CSR screens as well, but is not shown in other CSR screen drawings to simplify the depictions. Portions of screen 1301 have also been redacted to simplify the drawing.

FIG. 14 shows a table of customer service representative access levels under a role-based security system according to one preferred embodiment of the present invention. In this embodiment, a role-based security access system is devised to improve quality and prevent fraud by one or more potentially dishonest CSRs. A typical CSR according to this embodiment will be assigned a role such as, for example, Sales, Administration, or Check Clearing. Each role is assigned an a permission level to each part of payment system 12. In FIG. 14, three permission levels are depicted having three different levels of access to the security verification scoring portions of system (described with reference to FIGS. 11-13).

Permission level "1. See Levels" may be assigned, for example, to a CSR in a sales role. In this embodiment, three levels of access are granted in the security verification process. Permission level "1. See Levels" has permission or access to view the security verification scores assigned. Permission level "2. Process" has ability to process submitted security verification items as described with reference to FIGS. 11-13. Permission level "3. View" has ability to view the items listed. Permission level of "3. View" may be assigned to a CSR in a role of assigning user account permissions on payment system 12. Such a CSR would also have other permission(s) to assign roles.

Figure 15:
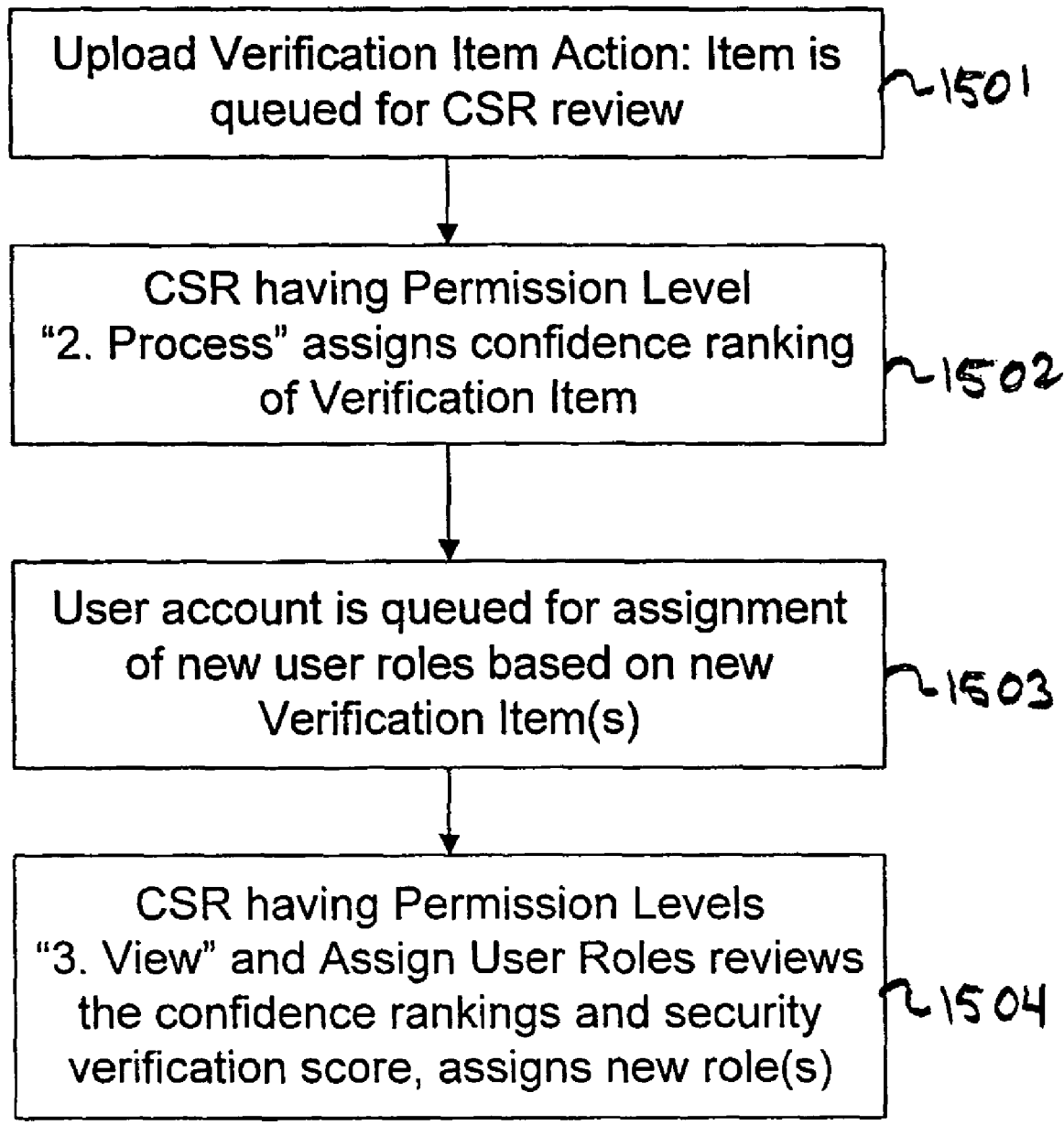
FIG. 15 depicts a user role assignment process according to one embodiment of the present invention.

FIG. 15 depicts a user role assignment process according to one embodiment of the present invention. In this embodiment, the permission levels described with reference to FIG. 13 are employed in a role-based process to securely assign user roles in a payment system 12. A user may wish to change their permissions on payment system 12. For example, the user may want to be granted permission to deposit money into their account on payment system 12 via an ACH (automated clearing house) money transfer. Such a change of permission is accomplished on the system by assigning roles to the user according to characteristics such as, for example, the user's security verification score.

In step 1501, the user uploads one or more new verification items, which are queued and then reviewed in step 1502 under the process described with reference to FIGS. 11-13. The CSR assigning the confidence ranking has a permission level 2 (FIG. 14). In step 1503, the user account is then queued for assignment of new user roles. Another CSR, who is not the same CSR in step 1502, will next review the confidence ranking and security verification score of the user and assign new roles if they are allowed based on the new security verification data (step 1504).

In the depicted process, no CSR may both process security verification items and assign roles based on the resulting security score. Consequently, two or more CSRs would have to collaborate to assign a user a fraudulent role. Further, other CSR roles may be included in the process of completing a particular transaction. For example, another CSR may be assigned the role of approving check deposits into accounts. Another exemplar process which may be administered according to the scheme depicted in FIG. 15 is user access to a debit card account. Payment system 12 may provide ability for a user to fund a debit card from their account. User access to such a feature may require, for example, a security verification score of 80. Such a score might be obtainable by submitting a driver's license that obtains a high security confidence ranking and a billing statement mailed to the user's home address that also obtains a high security confidence ranking. Other combinations of security verification items may also permit such access. In the role based security scheme according to one embodiment of the present invention, one CSR role would have ability to assign security confidence rankings. Another separate CSR role would assign permission to fund a debit card from the user's account.

FIG. 16 depicts a CSR administration screen 1601 according to one embodiment of the present invention. To simplify the depiction, portions of screen 1601 have been redacted. An administrative user with the appropriate role may select tab 1605 to access screen 1601. A role menu 1602 lists roles potentially available to the user under consideration, but currently denied. Buttons 1603 allow roles to be added or removed from the list 1604 of allowed roles. Such roles may include, for example, ability ("ability", "permission", "access") to receive ACH transfers, ability to fund an account with ACH transfers, ability to fund an account with a credit card, and many other roles. Typically, such roles will be assigned by one CSR and any needed transactions approvals conducted by other CSRs using the security access scheme described with reference to FIG. 15.

Figure 17:
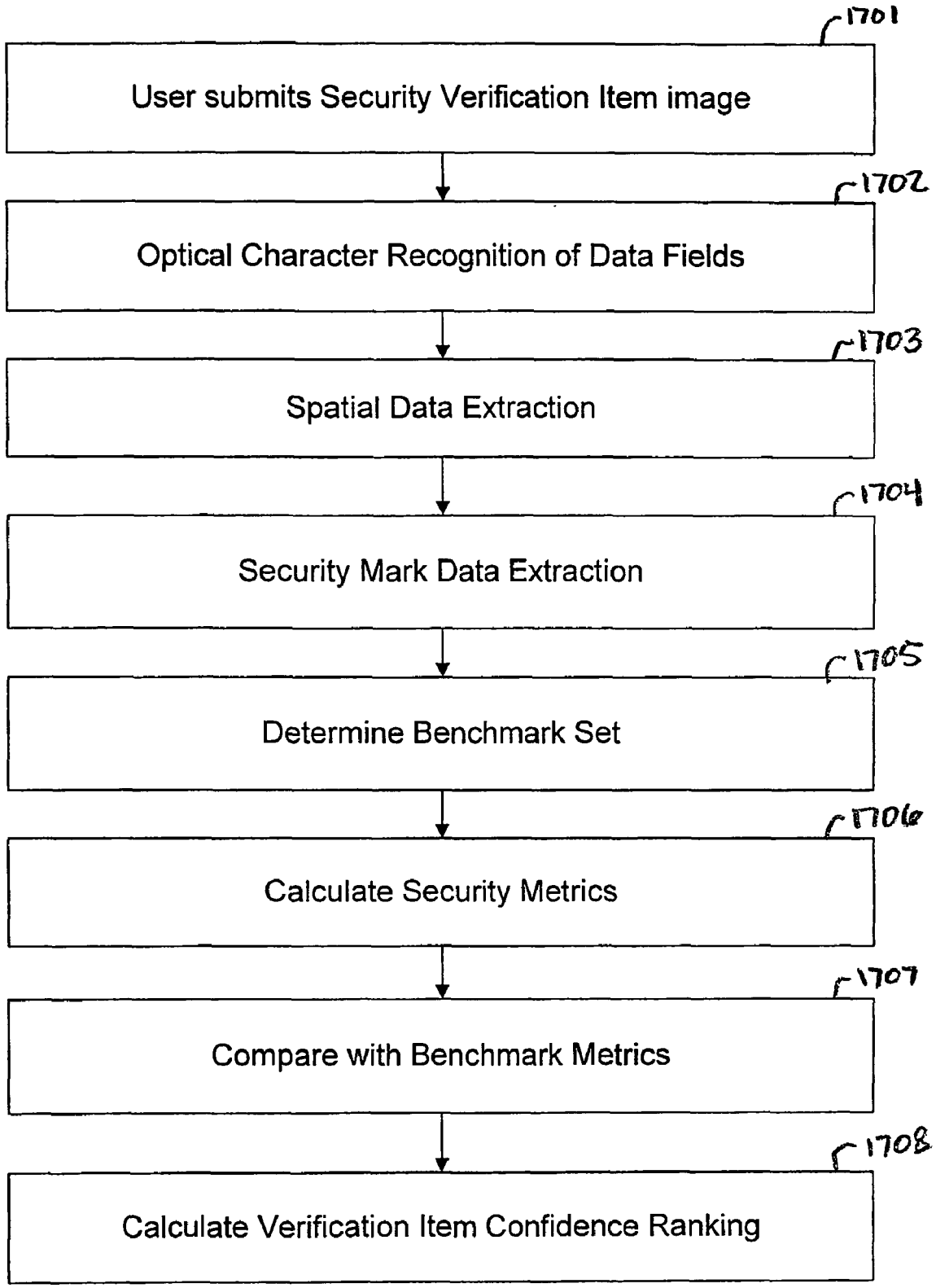
FIG. 17 depicts a flow chart of a security verification item confidence ranking process according to an alternative embodiment of the present invention.

FIG. 17 depicts a flow chart of a security verification item confidence ranking process according to an alternative embodiment of the present invention. In this embodiment, some or all of the process of generating a security verification item confidence ranking is automated in software, as compared to the process described with reference to FIG. 11, which has many functions performed by CSRs. In step 1701, a user submits a security verification item ("document"). Submission is preferably done by uploading an image of the document through the web interface of payment system 12, but may also be done by emailing image files or by mailing paper copies to payment service 12 for scanning. If a paper copy is submitted, it is scanned to produce an electronic image, which image is the output of step 1701. The process according to this embodiment preferably operates on a security verification item image that is an ID card, driver's license, passport, or other official document for which there is a known standard layout and security features. However, other security verification items may be processed according to this embodiment.

In step 1702 of this embodiment, the security verification item image is processed with Optical Character Recognition (OCR) software. The OCR software has routines and algorithms which extract the textual content of the image in letters, number, and other symbols. Such data is preferably stored in a series of data fields in the record for the security verification item in question or temporarily stored in RAM. The data extraction and processing steps may be performed successfully in other ordered sequences, and this sequence is not limiting.

In step 1703 of this embodiment, the security verification item image is processed with software to extract spatial data regarding the layout of the software. This step may produce data regarding the locations, on the document, of the various data fields scanned in step 1702. Also, other data may be produced such as, for example, size of characters in data fields, size and location of pictures, size and location of other markings such as background markings and security features, dimensions and size of security verification item, and spatial orientation of features.

In step 1704 of this embodiment, the security verification item image is processed with software to extract security mark data. Such data may include, for example, watermark and background mark images, colors, and fonts.

In step 1705 of this embodiment, the data extracted in step 1702 is used to determine a benchmark security metrics set with which to compare the data extracted from the security verification item. Typically, this step involves identifying the type and issuer of the security verification item such as, for example, identifying that the item is a U.S. passport or a Texas Driver's License. Data submitted by the user may also be used to find the appropriate benchmark for comparison to the submitted data. Preferably, this step is performed automatically in software.

In step 1706 of this embodiment, the security verification item image and the data extracted in previous steps is processed by software to calculate security metrics for the security verification item. Such metrics may include, for example, a checksum calculation for the document number or other number on the document, spatial metrics such as distances between certain items on the face of the document, and verification of proper ranges for numbers on the document.

In step 1707 of this embodiment, the software compares the metrics calculated in step 1706 to the selected benchmark metrics. Preferably, differences between the expected metrics and the benchmark metrics are added in a weighted form to produce a confidence ranking in the validity of the document and its owner (step 1708). Also, such a confidence ranking process may consider data about consistency between the data on the submitted document and other user submitted data such as account info and other security verification items.

One or more of the 1o steps in FIG. 17 may be performed by a CSR, but preferably all of the steps are performed by software. Such software may be an Action performed by model module 904 (FIG. 9) activated by controller servlet 902. Alternatively, the Action responding to a user upload of a security verification item may simply store the item and queue it for processing by another software module, such as, for example, a queue processing routine running on a schedule or activated by a CSR through an administrative action.

Figure 18:
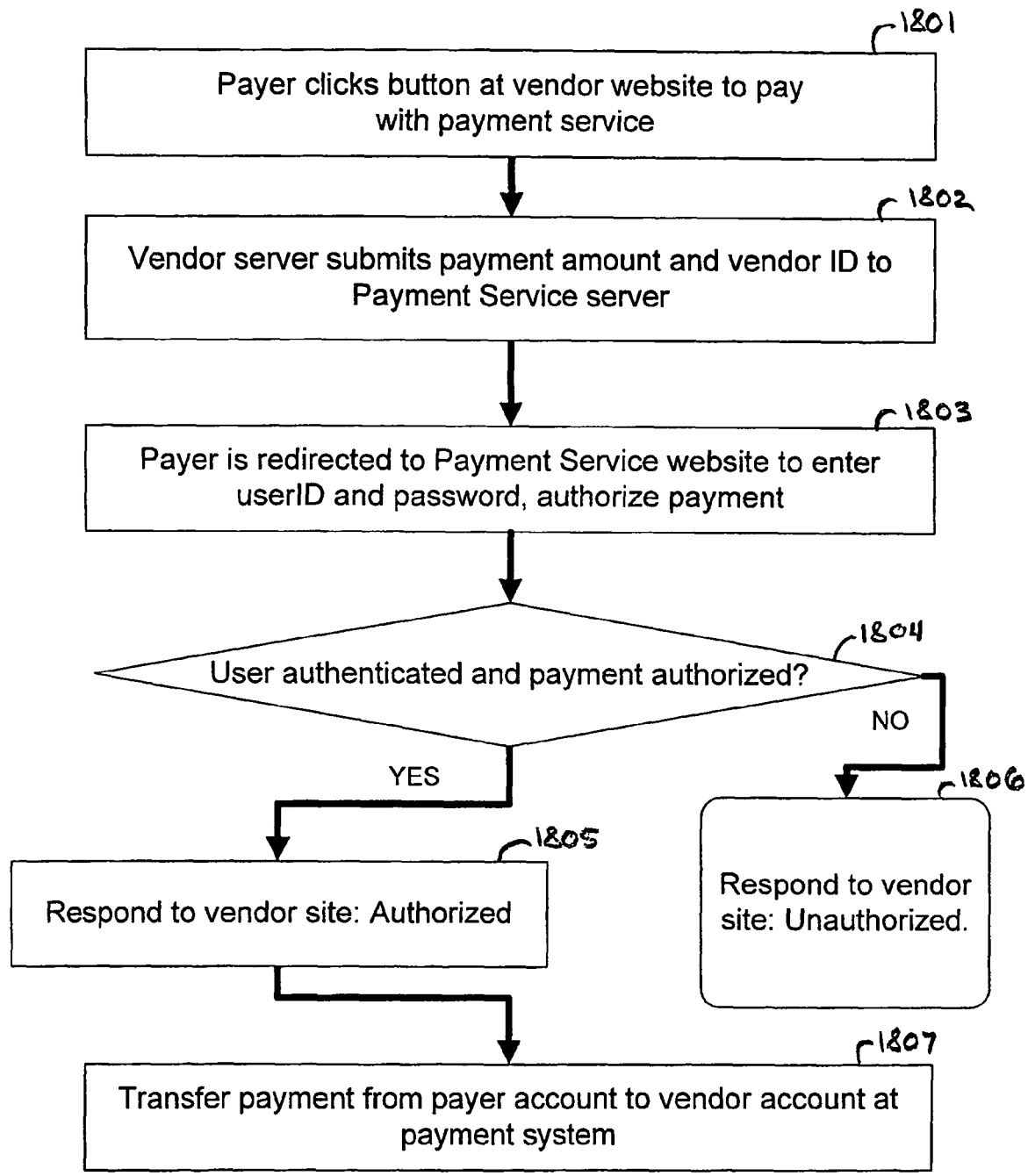
FIG. 18 depicts a flow chart of a vendor payment process according to one embodiment of the present invention.

FIG. 18 depicts a flow chart of a vendor payment process according to one embodiment of the present invention. In this embodiment, a vendor has an e-commerce site or merely a payment collection site, which provide payers 16 the ability to pay directly to the vendor's account with payment service 12. In step 1801, payer 16 clicks a button at the vendor website to pay through the payment service. In step 1802, the vendor internet server submits the vendor ID and the payment amount to the payment service.

In step 1803 of this embodiment, the vendor website directs payer 16's web browser to the payment service website to authorize the payment. Payer 16 enters their userID and password for their account at payment service. Preferably, payer 16 also has an opportunity to verify the payment amount. Payment service 12 authenticates payer 16 and payment authorization, including amount available in payer 16's account, in step 1804. An unsuccessful authentication may be prompted again for userID and password, and a final failure results in notice to the vendor website. If authorized, a notice is sent to the vendor server, preferably with a transaction number and authorization number in step 1805. Next, in step 1807, payment service 12 makes an account-to-account payment into the vendor's account from the payer's account.

Figure 19:
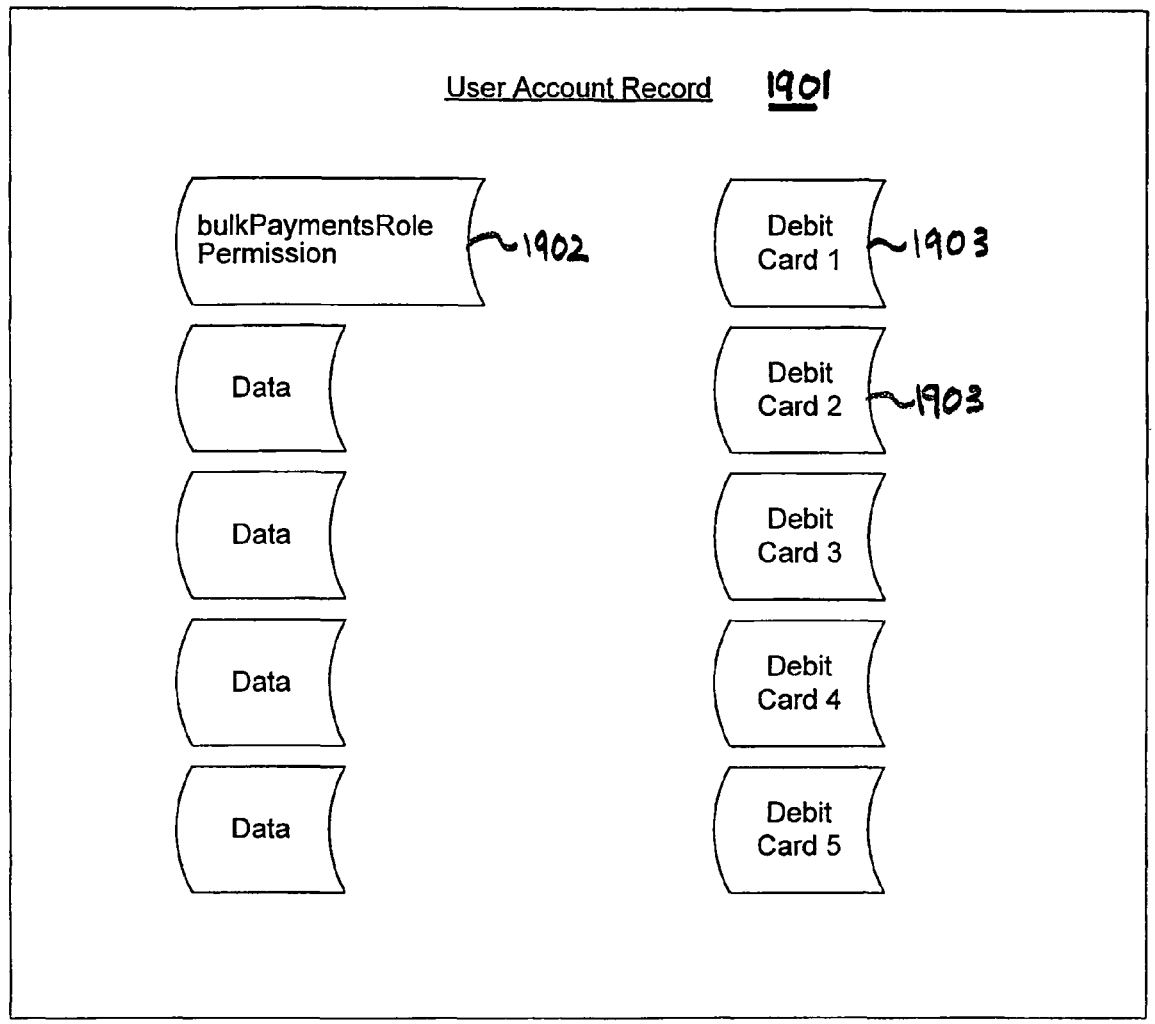
FIG. 19 depicts a user account record 1901 having a debit card arrangement according to one embodiment of the present invention.

FIG. 19 depicts a user account record 1901 having a debit card arrangement according to one embodiment of the present invention. In this embodiment, the user is a payer 16 who wishes to fund transactions through the use of multiple debit cards. A user will typically need a permission assigned to fund a debit card from their account. In this embodiment another permission level, "bulkPaymentsRole" from menu 1602 (FIG. 16), is recorded in the user's account record 1901 in permission record 1902. Such permission allows the user to fund more than one debit card.

A user may wish, for example, to make regular payroll payments to employees without issuing checks or direct deposit. In this example, the user would authorize five debit card records 1903, each associated with a debit card. A debit card matched with a record 1903 typically may be used as an ATM card or as a check card, with similar ability to conduct transactions around the world. The user may authorize a bulk payment which pays a certain amount to all cards from the user's account, or makes individual payments to single cards.

The payment amount may be set for each card, and authorized with a single bulk payment authorization. Further, a user may designate different groups of cards to receive bulk payments. Such a system may be employed to advantage in situations where, for example, a user has employees who do not have checking accounts, or if a user has employees overseas.

Although the present invention has been described in detail, it will be apparent to those skilled in the art that many embodiments taking a variety of specific forms and reflecting changes, substitutions and alterations can be made without departing from the spirit and scope of the invention. The described embodiments illustrate the scope of the claims but do not restrict the scope of the claims.

The invention claimed is:

1. A method of issuing and handling a financial instrument comprising the steps of:
   authorizing a user to access an internet-based interface;
   issuing an instrument having a first portion of a control code and a blank field for entering a second portion of the control code, the second portion of the control code associated with the first portion of the control code;
   receiving a submission of the first portion of the control code from the user;
   verifying the authinticity of the first portion of the control code;
   checking for any indication of a cancellation of the instrument related to the first portion of the control code; and
   issuing the second portion of the control code to the user.

2. The method of claim 1 further comprising the steps of:
   entering the second portion of the control code in the blank field; and
   enabling negotiation of the instrument based on the first and the second portion of the control code.

3. The method of claim 1 in which the internet-based interface comprises a website.

4. The method of claim 1 further comprising the step of confirming validity of the instrument by verifying the first and second portions of the control code.

5. The method of claim 4 in which the step of confirming validity of the instrument includes the substeps of:
   receiving an indication of an instrument number;
   receiving an indication of the control code;
   receiving an indication of the amount of the instrument.

6. The method of claim 4 in which the step of confirming validity of the instrument includes the substeps of: receiving an indication of the reason for validation.

7. The method of claim 6 in which the indication of the reason for validation is selected from the group comprising: accepting as payment, depositing to an account, cashing.

8. The method of claim 4 in which the step of confirming validity of the instrument includes the substeps of: receiving an indication of an entity seeking to confirm validity of the instrument, the indication of the entity being selected from the group comprising: financial institution, business, individual.

9. The method of claim 4 in which the step of confirming validity of the instrument includes the substep of presenting a confirmation history of the instrument to an entity seeking to confirm validity of the instrument.

* * * * *